United States Patent
Randall et al.

(10) Patent No.: US 11,407,926 B2
(45) Date of Patent: Aug. 9, 2022

(54) WATER-BASED ADHESIVES

(71) Applicant: Bridgestone Corporation, Tokyo (JP)

(72) Inventors: Amy M. Randall, Akron, OH (US);
William L. Hergenrother, Akron, OH (US); Sheel Agarwal, Solon, OH (US);
Ashley S. Hilton, Massillon, OH (US)

(73) Assignee: Bridgestone Corporation, Chuo-ku (JP)

( * ) Notice: Subject to any disclaimer, the term of this patent is extended or adjusted under 35 U.S.C. 154(b) by 1 day.

(21) Appl. No.: 16/858,194

(22) Filed: Apr. 24, 2020

(65) Prior Publication Data

US 2020/0248045 A1 Aug. 6, 2020

Related U.S. Application Data

(62) Division of application No. 14/363,230, filed as application No. PCT/US2012/068562 on Dec. 7, 2012, now abandoned.

(51) Int. Cl.
*C09J 111/02* (2006.01)
*C08K 3/04* (2006.01)
(Continued)

(52) U.S. Cl.
CPC .............. *C09J 111/02* (2013.01); *B32B 7/12* (2013.01); *B32B 25/042* (2013.01); *C08K 3/04* (2013.01);
(Continued)

(58) Field of Classification Search
CPC . C09J 111/02; C09J 11/00; C09J 11/04; C09J 11/06; C09J 11/08; C09J 107/02;
(Continued)

(56) References Cited

U.S. PATENT DOCUMENTS 2,776,190 A 1/1957 Mantell et al.
3,103,858 A 9/1963 Lauren
(Continued)

FOREIGN PATENT DOCUMENTS

CH 307987 6/1955
DE 927714 C 5/1955
(Continued)

OTHER PUBLICATIONS

Machine translation of JP 2006-002102, retrieved Oct. 18, 2021.*
(Continued)

*Primary Examiner* — Michael B Nelson
(74) *Attorney, Agent, or Firm* — Meredith E. Hooker; Nathan T. Lewis

(57) ABSTRACT

An adhesive includes a polymeric latex, a penetrant selected from the group consisting of: terpenes, polylimonene, limonene, carvone, α-pinene, citral, dipentene, 1,8-cineole, eucalyptol, citronellol, geraniol, citronellene, terpinen-4-ol, borneol, camphor, guayule resin, and combinations thereof; and a reinforcing filler. The adhesive has a solids content of 35-65% and a pH of 9 to 12. Articles of manufacture, such as tires and air springs incorporate the adhesive to join rubber interfaces. A method of making the adhesive is also is provided.

12 Claims, 3 Drawing Sheets

US 11,407,926 B2

Page 2

Related U.S. Application Data

(60) Provisional application No. 61/606,161, filed on Mar. 2, 2012, provisional application No. 61/567,701, filed on Dec. 7, 2011.

(51) Int. Cl.

| | | |
|---|---|---|
| *C08K 5/01* | (2006.01) | |
| *C08K 7/14* | (2006.01) | |
| *C09J 11/00* | (2006.01) | |
| *C09J 121/02* | (2006.01) | |
| *B32B 7/12* | (2006.01) | |
| *B32B 25/04* | (2006.01) | |
| *C09J 11/04* | (2006.01) | |
| *C09J 11/06* | (2006.01) | |
| *C09J 11/08* | (2006.01) | |
| *C09J 107/02* | (2006.01) | |
| *B29D 30/54* | (2006.01) | |

(52) U.S. Cl.
CPC ............... *C08K 5/01* (2013.01); *C08K 7/14* (2013.01); *C09J 11/00* (2013.01); *C09J 11/04* (2013.01); *C09J 11/06* (2013.01); *C09J 11/08* (2013.01); *C09J 107/02* (2013.01); *C09J 121/02* (2013.01); *B29D 2030/544* (2013.01); *B32B 2250/03* (2013.01); *B32B 2250/248* (2013.01); *B32B 2270/00* (2013.01); *B32B 2605/00* (2013.01); *Y10T 428/3183* (2015.04); *Y10T 428/31826* (2015.04)

(58) Field of Classification Search
CPC ........ C09J 121/02; B32B 7/12; B32B 25/042; B32B 2250/03; B32B 2250/248; B32B 2270/00; B32B 2605/00; C08K 3/04; C08K 5/01; C08K 7/14; B29D 2030/544; Y10T 428/31826; Y10T 428/3183
See application file for complete search history.

(56) References Cited

U.S. PATENT DOCUMENTS

| | | | |
|---|---|---|---|
| 3,460,975 A | 8/1969 | Stebleton | |
| 3,872,043 A | 3/1975 | Distugil | |
| 3,963,850 A | 6/1976 | Doss et al. | |
| 4,411,954 A | 10/1983 | Butch, III et al. | |
| 4,477,613 A * | 10/1984 | Evans | C08L 93/04 524/187 |
| 4,542,191 A | 9/1985 | Kay et al. | |
| 4,601,892 A | 7/1986 | Hart et al. | |
| 4,704,225 A | 11/1987 | Stoufer | |
| 4,737,577 A | 4/1988 | Brown | |
| 4,824,501 A | 4/1989 | Ushikubo et al. | |
| 4,973,485 A | 11/1990 | Rich | |
| 5,196,258 A * | 3/1993 | Keller | C08J 5/06 442/381 |
| 5,330,832 A | 7/1994 | Liu | |
| 5,362,714 A | 11/1994 | Radford et al. | |
| 5,387,524 A | 2/1995 | Hayashibe | |
| 5,395,879 A | 3/1995 | Murray | |
| 5,441,996 A | 8/1995 | Cummings et al. | |
| 5,536,778 A | 7/1996 | Kreckel et al. | |
| 5,565,511 A * | 10/1996 | Braud | C09J 121/02 524/270 |
| 5,652,298 A | 7/1997 | Murray | |
| 5,691,408 A * | 11/1997 | Murray | C09J 121/02 524/284 |
| 5,728,759 A | 3/1998 | Pike | |
| 5,783,551 A | 7/1998 | Mirsky | |
| 5,807,917 A | 9/1998 | Sulc et al. | |
| 5,807,918 A | 9/1998 | Carter | |
| 5,938,869 A | 8/1999 | Kaido et al. | |
| 5,951,797 A | 9/1999 | Majumdar et al. | |
| 5,962,564 A | 10/1999 | Braud et al. | |
| 6,127,476 A | 10/2000 | Jialanella et al. | |
| 6,136,123 A | 10/2000 | Kaido et al. | |
| 6,184,294 B1 | 2/2001 | Park et al. | |
| 6,204,321 B1 | 3/2001 | Lanoye | |
| 6,281,298 B1 | 8/2001 | Papsin, Jr. | |
| 6,399,544 B1 | 6/2002 | Fairchild et al. | |
| 6,402,867 B1 | 6/2002 | Kaido et al. | |
| 6,439,550 B1 * | 8/2002 | Koch | C08J 5/124 156/314 |
| 6,590,017 B1 | 7/2003 | Hergenrother et al. | |
| 6,608,132 B1 | 8/2003 | Bomo et al. | |
| 6,719,279 B1 * | 4/2004 | Koch | F16F 9/0409 267/64.24 |
| 6,767,947 B2 | 7/2004 | Musch et al. | |
| 7,175,897 B2 | 2/2007 | Baron et al. | |
| 7,730,919 B2 | 6/2010 | Kanenari | |
| 7,799,750 B2 | 9/2010 | Kaneko | |
| 2003/0027904 A1 | 2/2003 | Cordova | |
| 2003/0100665 A1 * | 5/2003 | Oba | C08L 11/02 524/552 |
| 2004/0033254 A1 | 2/2004 | Song et al. | |
| 2004/0147663 A1 | 7/2004 | Silvers et al. | |
| 2004/0158003 A1 | 8/2004 | Ruckel et al. | |
| 2004/0185249 A1 | 9/2004 | Junghans et al. | |
| 2004/0241246 A1 | 12/2004 | Lipman | |
| 2005/0100754 A1 | 5/2005 | Moncla et al. | |
| 2007/0160833 A1 | 7/2007 | Maak et al. | |
| 2007/0207313 A1 | 9/2007 | Ruckel et al. | |
| 2007/0219286 A1 | 9/2007 | Ishii | |
| 2007/0224395 A1 | 9/2007 | Rowitsch et al. | |
| 2007/0249759 A1 | 10/2007 | Miller | |
| 2008/0282949 A1 | 11/2008 | Jamal | |
| 2009/0065121 A1 | 3/2009 | Silvers et al. | |
| 2009/0099309 A1 | 4/2009 | Gumbs | |
| 2010/0022417 A1 | 1/2010 | Acunto | |
| 2010/0312454 A1 | 12/2010 | Nada et al. | |
| 2011/0118404 A1 | 5/2011 | Jung et al. | |
| 2012/0118465 A1 | 5/2012 | Majumdar et al. | |
| 2012/0252713 A1 | 10/2012 | Beatty et al. | |
| 2012/0312454 A1 * | 12/2012 | Seferin | C08J 3/092 156/123 |
| 2014/0329102 A1 | 11/2014 | Randall et al. | |
| 2015/0368419 A1 | 12/2015 | Randall et al. | |

FOREIGN PATENT DOCUMENTS

| | | |
|---|---|---|
| EP | 0049402 A1 | 4/1982 |
| EP | 0518194 A1 | 12/1992 |
| EP | 0761477 A1 | 3/1997 |
| EP | 0842793 A1 | 5/1998 |
| FR | 2529564 A1 | 1/1984 |
| GB | 11175 | 5/1913 |
| GB | 11175 A | 1/1914 |
| GB | 836250 | 6/1960 |
| JP | H10306266 A | 11/1998 |
| JP | 2001026756 A | 1/2001 |
| JP | 2001064616 A | 3/2001 |
| JP | 2002053702 A | 2/2002 |
| JP | 2002060711 A | 2/2002 |
| JP | 2003147125 A | 5/2003 |
| JP | 2004224916 A | 8/2004 |
| JP | 2005105218 A | 4/2005 |
| JP | 2006002102 A | 1/2006 |
| JP | 2006077038 A | 3/2006 |
| JP | 2006-002102 * | 12/2006 |
| JP | 2007070464 A | 3/2007 |
| KR | 1020050044993 A | 5/2005 |
| WO | 9519385 A1 | 7/1995 |
| WO | 9735914 | 10/1997 |
| WO | 03037980 A1 | 5/2003 |
| WO | 03089511 A1 | 10/2003 |
| WO | 2010019862 A1 | 2/2010 |
| WO | 2011079365 A1 | 7/2011 |

OTHER PUBLICATIONS

Chiche, A. et al., "Cavity growth in soft adhesives," The European Physical Journal E, vol. 17, pp. 389-401 (2005).

(56) References Cited

OTHER PUBLICATIONS

Class, Jay B., "Tackifying rubber compositions," Rubber World, pp. 44-50 (Oct. 1998).
Fitch, J.C. et al.,"Pressure-Sensitive Adhesives Based on Neoprene Latex 102," Adhesives Age, pp. 23-26 (Oct. 1977).
Font, R. et al., "Leaching of Toluene-Neoprene Adhesive Wastes," Environmental Science & Technology, vol. 35, No. 5, pp. 977-983 (2001).
Font, R. et al., "Reduction of solvent content in toluene-neoprene adhesives and in acetone-polyurethane adhesives," Journal of Adhesion Science and Technology, vol. 15, No. 14, pp. 1677-1693 (2001).
Hong, Sung Ran, International Search Report with Written Opinion from PCT/US2012/068562, 13 pp. (Mar. 27, 2013).
Jovanovic, R. et al., "Emulsion-Based Pressure-Sensitive Adhesives: A Review," Journal of Macromolecular Science, Part C: Polymer Reviews, vol. 44, No. 1, pp. 1-51 (2004).
Matulewicz, C.M. et al., "Neoprene Latex Pressure-sensitive Adhesives," Adhesives Age, pp. 40-43 (Mar. 1981).
Oldack, Richard C. et al., "Compounding Natural Latex in Water-Based PSA's," Product Information from Firestone Synthetic Rubber and Latex Company, pp. 12-1 thru 12-10 (1979).
Snow, Jr. A.M., "Contact Adhesives Based on Carboxylated Neoprene Latex," Adhesives Age, pp. 35-37 (Jul. 1980).
Tirumkudulu, Mahesh et al., "Measuring the 'tack' of waterborne adhesives," Journal of Rheology, vol. 47, No. 6, pp. 1399-1415 (Nov./Dec. 2003).
Varghese, Lity Alen et al., "Performance of neoprene-phenolic adhesives on different substrates," Journal of Adhesion Science and Technology, vol. 20, No. 14, pp. 1625-1635 (2006).
Yang, Henry W.H. et al., "The Role of Viscoelastic Properties in the Design of Pressure-sensitive Adhesives," Reviews, vol. 5, No. 11, pp. 380-384 (Nov. 1997).
Zosel, Albrecht, "Build to Last," Adhesives Age, pp. 34-40 (Aug. 2000).
"Supplementary European Search Report for European Patent Application No. EP12854734.6", dated Jul. 2, 2015, 4 pages.
White and De, Rubber Technologist's Handbook, p. 148 (Rapra Tech. Ltd. 2001).
The State Intellectual Property Office of P.R. China, "Office Action for Chinese Patent Application No. 201280066341.8", dated Oct. 16, 2015, 6 pages.
Takashiro, "Office Action for Japanese Patent Application No. 2014-546143", dated Aug. 17, 2016, 19 pages.
Belfiore, Laurence A., "Physical Properties of Macromolecules", John Wiley & Sons, Inc., 4 pages.
Chemistry Encyclopedia, "Residue", Retrieved Date: Nov. 6, 2017, Retrieved At: «http://www. chemistryexplained.com/Pr-Ro/Residue. html», 2 pages.
Pamies Olle, Silvia, "Extended European Search Report for European Patent Application No. 14774552.5", dated Sep. 30, 2016, 9 pages.
Chang, Bong Ho, "International Search Report with Written Opinion for PCT Patent Application No. PCT/US2014/025201", dated Aug. 5, 2014, 10 pages.
Dejoye, Tanzi, et al., "Terpenes as Green Solvents for Extraction of Oil From Microalgae", Molecules, vol. 17, pp. 8196-8205 (2012).
Arizona Chemical, "Sylvares ZT 105LT", Product Data Sheet, Oct. 27, 2016, 11 pages.
Pubchem, "Dodecane", In U.S. National Library of Medicine, National Center for Biotechnology Information, C12H26, Retrieved Date: Jul. 13, 2018, Retrieved At: «https://pubchem.ncbi.nim.nih. gov/compound/dodecane#section=Top», 75 pages.
Tanzi, et al., "Terpenes as Green Solvents for Extraction of Oil from Microalgae", In Molecules, vol. 17, 2012, pp. 8196-8205.
Bart, Jan C.J., "Additives in Polymers Industrial Analysis and Applications", John Wiley & Sons, Ltd., 2005, 14 pages.
Nelson, Michael B., "Restriction Requirement for U.S. Appl. No. 14/363,230", dated Aug. 18, 2015, 8 pages.
Lewis, Nathan T., "Response to the Restriction Requirement for U.S. Appl. No. 14/363,230", filed Oct. 19, 2015, 4 pages.
Nelson, Michael B., "Office Action for U.S. Appl. No. 14/363,230", dated Nov. 24, 2015, 10 pages.
Lewis, Nathan T., "Response to the Office Action for U.S. Appl. No. 14/363,230", filed Mar. 24, 2016, 8 pages.
Nelson, Michael B., "Final Office Action for U.S. Appl. No. 14/363,230", dated May 31, 2016, 14 pages.
Lewis, Nathan T., "Response to the Final Office Action for U.S. Appl. No. 14/363,230", filed Aug. 1, 2016, 9 pages.
Nelson, Michael B., "Advisory Action for U.S. Appl. No. 14/363,230", dated Aug. 16, 2016, 3 pages.
Lewis, Nathan T., "Response to the Advisory Action for U.S. Appl. No. 14/363,230", filed Sep. 30, 2016, 11 pages.
Nelson, Michael B., "Office Action for U.S. Appl. No. 14/363,230", dated Dec. 7, 2016, 13 pages.
Lewis, Nathan T., "Response to the Office Action for U.S. Appl. No. 14/363,230", filed Apr. 7, 2017, 10 pages.
Nelson, Michael B., "Final Office Action for U.S. Appl. No. 14/363,230", dated Jun. 23, 2017, 18 pages.
Lewis, Nathan T., "Response to the Final Office Action for U.S. Appl. No. 14/363,230", filed Sep. 25, 2017, 10 pages.
Nelson, Michael B., "Advisory Action for U.S. Appl. No. 14/363,230", dated Sep. 29, 2017, 2 pages.
Lewis, Nathan T., "Response to the Advisory Action for U.S. Appl. No. 14/363,230", filed Nov. 21, 2017, 9 pages.
Nelson, Michael B., "Office Action for U.S. Appl. No. 14/363,230", dated Jan. 4, 2018, 23 pages.
Oxford English Dictionary, "Residue", Retrieved Date: Dec. 31, 2017, Retrieved At: «https://en.oxforddictionaries.com/defenition/ residue», 4 pages.
Lewis, Nathan T., "Response to the Office Action for U.S. Appl. No. 14/363,230", filed Apr. 4, 2018, 11 pages.
Nelson, Michael B., "Final Office Action for U.S. Appl. No. 14/363,230", dated Jun. 11, 2018, 30 pages.
Lewis, Nathan T., "Response to the Final Office Action for U.S. Appl. No. 14/363,230", filed Sep. 11, 2018, 13 pages.
Nelson, Michael B., "Advisory Action for U.S. Appl. No. 14/363,230", dated Sep. 20, 2018, 3 pages.
Lewis, Nathan T., "Notice of Appeal for U.S. Appl. No. 14/363,230", filed Oct. 11, 2018, 2 pages.
Lewis, Nathan T., "Appeal Brief Filed for U.S. Appl. No. 14/363,230", filed Jan. 11, 2019, 22 pages.
Nelson, Michael B., "Examiner's Answer to Appeal Brief for U.S. Appl. No. 14/363,230", dated Feb. 7, 2019, 37 pages.
Lewis, Nathan T., "Reply Brief Filed for U.S. Appl. No. 14/363,230", filed Apr. 8, 2019, 12 pages.
Nelson, Michael B., "Patent Board Decision for U.S. Appl. No. 14/363,230", dated Feb. 24, 2020, 15 pages.

\* cited by examiner

WATER-BASED ADHESIVES

CROSS-REFERENCE TO RELATED APPLICATIONS

This is a divisional of U.S. application Ser. No. 14/363,230 that entered the U.S. national stage on Jun. 5, 2014, which was a national stage application of PCT/US2012/068562, file on Dec. 7, 2012 which in turn, claimed the benefit of priority to U.S. provisional application 61/567,701, filed Dec. 7, 2011, and U.S. provisional application 61/606,161, filed Mar. 2, 2012. These prior applications are herein incorporated by reference.

FIELD

This disclosure relates to adhesives, particularly water-based adhesives for rubber compositions in the tire and air spring industry.

BACKGROUND

Articles made from connected rubber components may be joined together with adhesive. In some applications, adhesives may be the primary option for joining components, particularly when mechanical methods such as stitching are not available, such as in articles that function as air or moisture barriers. For example, rubber air springs and tires include separate rubber components that are joined with adhesives. Retread tires also may employ adhesive to join the new tread to the carcass, or to adhere an intermediate cushion layer to a carcass and/or a tread.

While two similar rubber components can be joined and then cured at the same time and obtain a strong bond at the joint, this method of joining rubber components is not preferable for some manufacturing processes where it is desirable to join the components and store them and/or allow them to cure slowly. Rubber adhesives may be used to provide tack to a rubber component while a rubber article is cured or stored.

SUMMARY

In an embodiment, an adhesive includes a polymeric latex, a penetrant selected from the group consisting of: terpenes, polylimonene, limonene, carvone, α-pinene, citral, dipentene, 1,8-cineole, eucalyptol, citronellol, geraniol, citronellene, terpinen-4-ol, borneol, camphor, guayule resin, and combinations thereof; and a reinforcing filler. The adhesive has a solids content of about 35 to about 65% and a pH of about 9 to 12.

In an embodiment, an article of manufacture includes an elastomeric rubber component comprising an elastomer selected from the group consisting of: polychloroprene, butyl rubber, hevea and non-hevea derived natural rubber, polyisoprene, polybutadiene, nitrile rubber, poly(styrene-butadiene), and combinations thereof. The elastomeric rubber component is joined at an interface with a second rubber component or another portion of the elastomeric rubber component. The interface includes a layer of adhesive, which comprises: a polymeric latex; a penetrant selected from the group consisting of: terpenes, polylimonene, limonene, carvone, α-pinene, citral, dipentene, 1,8-cineole, eucalyptol, citronellol, geraniol, citronellene, terpinen-4-ol, borneol, camphor, guayule resin, and combinations thereof; and a reinforcing filler.

In an embodiment, a method includes the steps of: mixing together an adhesive composition comprising: a polymeric latex; a penetrant selected from the group consisting of: terpenes, polylimonene, limonene, carvone, α-pinene, citral, dipentene, 1,8-cineole, eucalyptol, citronellol, geraniol, citronellene, terpinen-4-ol, borneol, camphor, guayule resin, and combinations thereof; and a reinforcing filler.

DETAILED DESCRIPTION

Figure 1:
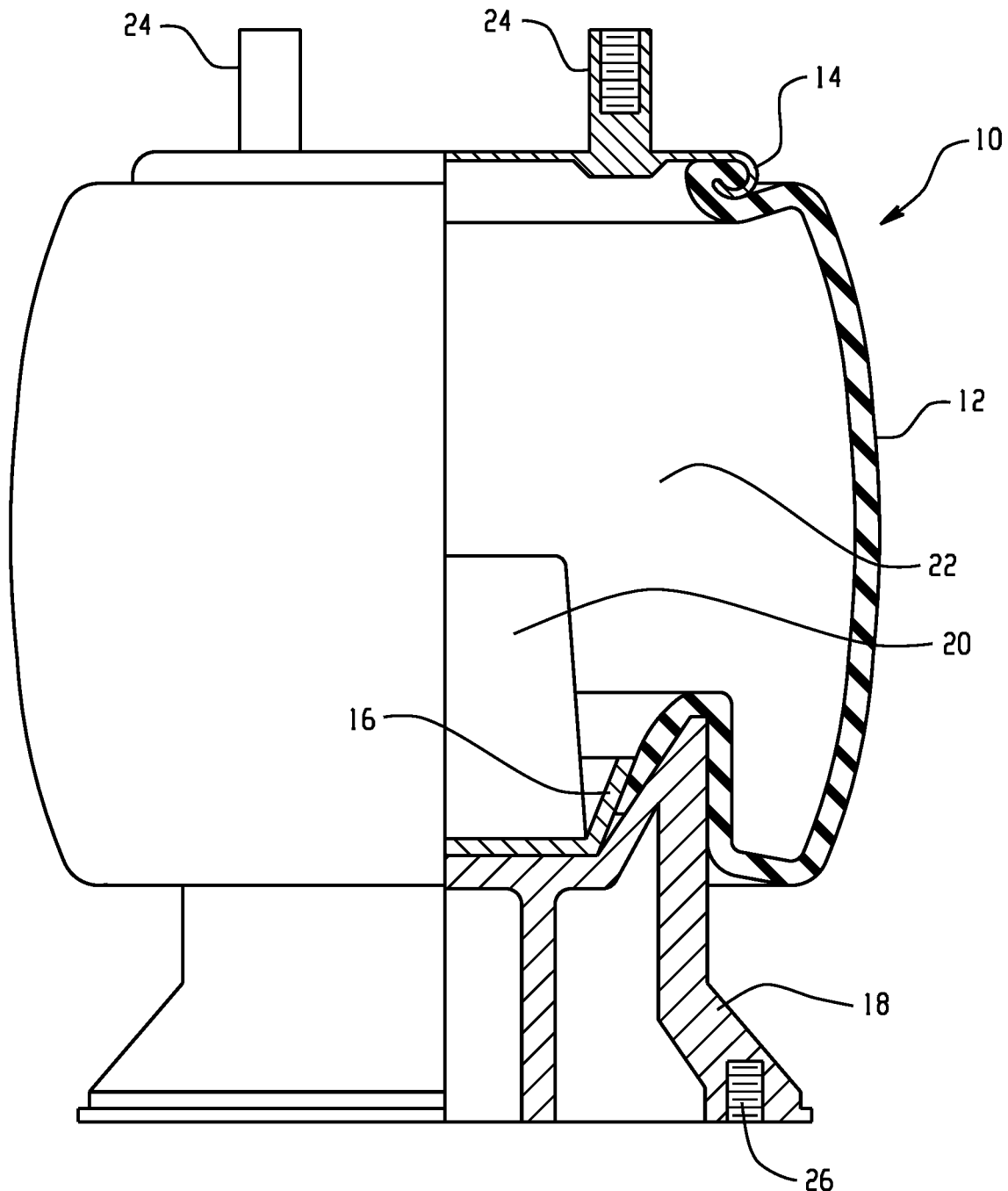
FIG. 1 is a partial cross-sectional view of an embodiment of an air spring.

U.S. provisional application 61/567,701, titled "Water-Based Adhesive," filed on Dec. 7, 2011 and U.S. provisional application 61/606,161, titled "Water-Based Adhesive Including Guayule Extract," filed on Mar. 2, 2012 are incorporated herein by reference for all purposes.

Disclosed herein is a water-based, low VOC, latex adhesive for joining rubber interfaces. The adhesive may be useful in a variety of applications. Particular examples of applications include those that require strong rubber-to-rubber joints and that are utilized to provide an air barrier, such as air springs and tire components. Application of new tread to retreaded tires is another application where the composition described herein may have particular utility.

In an embodiment the adhesive includes the following components: an aqueous polymeric latex, a penetrant, a reinforcing filler, a tackifier, and a stabilizer. In another embodiment, either the penetrant or the stabilizer or both may be omitted.

In an embodiment, the polymeric latex of the adhesive may be an aqueous emulsion of elastomers such as hevea and non-hevea (including guayule) natural rubber, polyisoprene, poly(styrene-butadiene), poly(isoprene-styrene), poly(isoprene-butadiene), polybutadiene, polychloroprene, nitrile rubber, butyl rubber, and combinations thereof.

In an embodiment, the polymeric portion of the latex may have a weight average molecular weight (Mw) of about 100,000 to about 30,000,000 g/mol, such as about 100,000 to about 10,000,000 g/mol or about 100,000 to about 5,000,000 g/mol and a number average molecular weight (Mn) of about 100,000 to about 30,000,000 g/mol, such as about 100,000 to about 10,000,000 g/mol or about 100,000 to about 5,000,000 g/mol. The polymer portion may have a Tg of about −110° C. to about 10° C., such as about −110° C. to about −10° C. or about −110° C. to about −25° C.

In an embodiment, the polymeric latex may have a solids content of about 10% to about 90%, such as about 20% to about 80%, or about 30% to about 70%. The pH of the polymeric latex may be about 7 to about 14, such as about 8 to about 13 or about 9 to about 12.

Without being bound to theory, when the adhesive is applied to an elastomer substrate, the penetrant component operates to open up the interstices of the polymeric matrix of the elastomer it is applied to. This allows the adhesive composition to have better penetration and intermingling with the substrate elastomer. The surface area of the interface between the adhesive and the elastomer substrate is also increased.

In an embodiment, the penetrant is selected from terpenes, such as polylimonene, limonene, α-pinene, dipentene, citronellene; or from the group consisting of carvone, citral, 1,8-cineole, eucalyptol, citronellol, geraniol, terpinen-4-ol, borneol, camphor, and combinations thereof. In certain embodiments the penentrant is substantially or completely free of VOCs.

In another embodiment, the penetrant is guayule resin. As used herein, "guayule resin" means the naturally occurring non-rubber chemical entities present in guayule shrub matter. These chemical entities include, but are not limited to, resins (such as terpenes), fatty acids, proteins, and inorganic materials, and include both polar and non-polar moieties. Guayule resin can result from the isolation of rubber from guayule shrub using organic solvent based processes. The resin represents the dried fraction (i.e., solvent removed) of material isolated in the polar organic solvent phase from such a process.

In an embodiment, the guayule resin can be added as guayule rubber latex, such latex including both the guayule rubber and the guayule resin for use as the penetrant. In this embodiment, two components of the adhesive may be fulfilled by one source material. In another embodiment, purified guayule latex comprising 5% or less, alternatively 3% or less, or 1% or less guayule resin may be used in the adhesive composition. In this embodiment, the penetrant is added separately, and may include guayule resin.

The reinforcing filler component provides improved strength and durability to the adhesive composition. This is in contrast to many adhesives that use no or very little reinforcing filler. For example, some adhesive manufacturers may use carbon black in very small amounts to tint the adhesive, but not in reinforcing amounts.

In an embodiment, the reinforcing filler is carbon black, such as reinforcing grade carbon black. Examples include carbon black in the N100, N200, and N300 series. In some embodiments, a higher surface area carbon black may provide improved performance. For example, the carbon black may have an $N_2SA$ surface area of about 10 to about 150 $m^2/g$, such as about 20 to about 140 $m^2/g$ or about 30 to about 130 $m^2/g$. In some embodiments, an aqueous carbon black dispersion may be used. Preferably, the dispersion contains carbon black in an amount from about 20% to about 50% by weight of the dispersion and the dispersion has a pH from about 7 to about 12. The particle size of the carbon black used in such dispersions is preferably from about 10 to about 150 $m^2/g$. Aqueous carbon black dispersions which may be employed include, for example, AQUABLAK 5101, which is available from Solution Dispersions, and includes a N100 series carbon black with 40% solids and pH of 10-1, and is stabilized with anionic and non-ionic surfactants.

The reinforcing fillers may be present in the adhesive in an amount of about 10 to about 80 phr ("per hundred rubber" is a by weight measure, and is based on the weight of the polymer in the polymeric latex set to 100), for example, about 15 to about 60 phr, or about 20 to about 40 phr.

The tackifier provides improved tack to the adhesive. Tackifiers that may be employed include, for example, TACOLYN 5003, TACOLYN 5070, or AQUATAC 6025. TACOLYN 5003 and 5070 are from EASTMAN CHEMICAL COMPANY, and they are aliphatic hydrocarbon resin tackifiers with a softening point of 70-130° C. and a solids content of 45-50%. AQUATAC 6025 is from ARIZONA CHEMICAL, Co., and has a softening point of 26° C. and a solids content of 59-63%.

In an embodiment, the tackifier may be present in an amount of about 5 to about 40 phr, such as about 10 to about 35 phr, or about 15 to about 30 phr. In an embodiment, the tackifier has a pH of about 2 to about 13, such as about 3 to about 12, or about 4 to about 11 and a solids content of about 30 to about 80%, such as about 35 to about 75%, or about 40 to about 70%. In an embodiment, the tackifier has a softening point of about 5 to about 170° C., such as about 15 to about 150° C., or about 25 to about 130° C.

The stabilizer component aids in keeping the composition in a latex emulsion state. An example class of stabilizers is non-ionic surfactants, such as IGEPAL CO-887, which is a non-ionic surfactant from Rhodia Group. IGEPAL CO-887 is a nonylphenoxy poly(ethyleneoxy)ethanol surfactant stabilizer with a 70% solids content. Other examples of stabilizers that may be used in embodiments of the adhesive composition include: PLURONIC F-68 from BASF, probenecid (4-(dipropylsulfamoyl)benzoic acid), tetraethyl orthosilicate, TWEEN 80, and acryloamido-2-methyl-1-propanesulfonic acid. The stabilizer may also be present in the polymeric latex component, rather than as a separately added component.

In an embodiment, the stabilizer may be present in an amount of about 0 to about 10 phr, such as about 1 to about 6 phr, or about 2 to about 4 phr. In an embodiment, the stabilizer has a pH of about 5 to about 13, such as about 6 to about 12, or about 7 to about 11 and a solids content of about 35 to about 85%, such as about 40 to about 80%, or about 45 to about 75%.

In an embodiment, the composition is substantially or completely free of cure agents, such as, for example, sulfur or peroxide. Substantially free in this context means that no cure agents are added for the purpose of curing the composition, and are only present for another purpose in the composition or as accidental contaminants, for example, less than 1 phr or less than 0.1 phr. However, in another embodiment, cure agents may also be used in conventional quantities. Without being bound by theory, it is believed that the cure agents and accelerators that leach out of the elastomer substrate that the adhesive is applied to are sufficient to impart a cure to the adhesive under curing conditions. The penetrant is believed to aid in leaching sufficient quantities of the cure agent and accelerators from the elastomer substrate.

In an embodiment, the entire adhesive composition will have a pH of about 7 to about 14, such as about 8 to about 13, or about 9 to about 12, and a solids content of about 25 to about 75%, such as, about 30% to about 70%, or about 35 to about 65%. Furthermore, in an embodiment, the adhesive will be substantially or completely free of VOCs. A volatile organic compound (VOC) is any carbon-based compound that will vaporize at standard room temperatures. There are many organic compounds that fall into this category, with methane, formaldehyde and acetone among the most prevalent and well-known VOCs. These compounds are produced through natural biological processes as well as through chemical reactions in manufacturing and industry. Whether a composition is free or substantially free of VOCs is based upon its vapor pressure.

In an embodiment of the method of making of the adhesive the components listed above are mixed together at ambient temperature. Namely, the polymeric latex, the penetrant, the reinforcing filler, the tackifier, and the stabilizer are mixed together. In another embodiment, either the penetrant or the stabilizer or both may be omitted.

The components may be added sequentially or simultaneously, in the order they are listed above or in a different order. For example, the components may be sequentially added and allowed to slowly rotate in a closed vessel long enough to ensure mixing and good dispersion, such as at least 24 hours.

While the mixing conditions and order of component addition may be varied, care should be taken to maintain the composition in the latex emulsion phase. In this regard, maintaining a solids content of 35-65% and a pH of 9 to 12 throughout the steps of the method is preferred.

The adhesive composition thus formed may be applied to a substrate such as a cured or an uncured rubber composition by, for example, rolling, spraying, or extruding it onto the substrate. After application to an uncured rubber substrate the adhesive and the uncured composition may be then cured under conditions necessary for the substrate to cure. Without being bound by theory, the cure agent and accelerators in the substrate are believed to leach into the adhesive in a sufficient quantity to cause the adhesive to cure also.

The substrates that the adhesive may be utilized to join include elastomeric rubber substrates such as rubber compositions that have as the polymeric component polychloroprene, butyl rubber, hevea and non-hevea natural rubber, polyisoprene, polybutadiene, nitrile rubber, poly(isoprene-styrene), poly(isoprene-butadiene), poly(styrene-butadiene), and combinations thereof. The adhesive may also have some utility for bonding metals, wood, and other types of substrates.

FIG. 1 shows an embodiment of a reversible sleeve air spring 10 In FIG. 1, the air spring assembly 10 includes flexible airsleeve 12. Bead plate 14 is crimped to airsleeve 12 to form an airtight seal between the bead plate 14 and airsleeve 12. Similarly, end closure 16 is molded to the flexible airsleeve 12 to form an airtight seal between end closure 16 and airsleeve 12. End closure 16 of airsleeve 12 is affixed to piston 18 by mechanical means well known in the art, including, for example, a piston bolt (not shown). Piston 18 provides a surface for the flexible airsleeve 12 to roll on during compressive travel. The reversible air spring assembly 10 may optionally include a bumper 20 to support the vehicle when there is no air in the air springs or during extreme road disturbances. Enclosed within airsleeve 12 is a volume of gas 22. Studs 24 and hole 26 are used to secure the reversible air spring assembly 10 to the mounting surface of an automobile (not shown).

In one example, the application adhesive is applied between rubber layers for air-springs to securely join them at an interface. Within such rubber layers it may contain fibers and/or woven-fabric for reinforcement.

Air springs are widely used in large vehicles, such as buses and trucks, because they allow fixedly holding a vehicle's posture against a load change from curb weight to payload weight by controlling the supply of air and the discharge of air to the exterior. In addition, the spring constant can be set to a low level to improve the ride comfort and prevent the damage of freight.

Typical air spring rubber compositions include one or more diene polymers, such as polychloroprene; a reinforcing filler, such as carbon black, in an amount such as 20-100 phr; a cure agent, accelerators, wax, plasticizing oil, antioxidants, and other additives. An example air spring composition is disclosed in WO 2010/019862, which is incorporated herein by reference.

Figure 2:
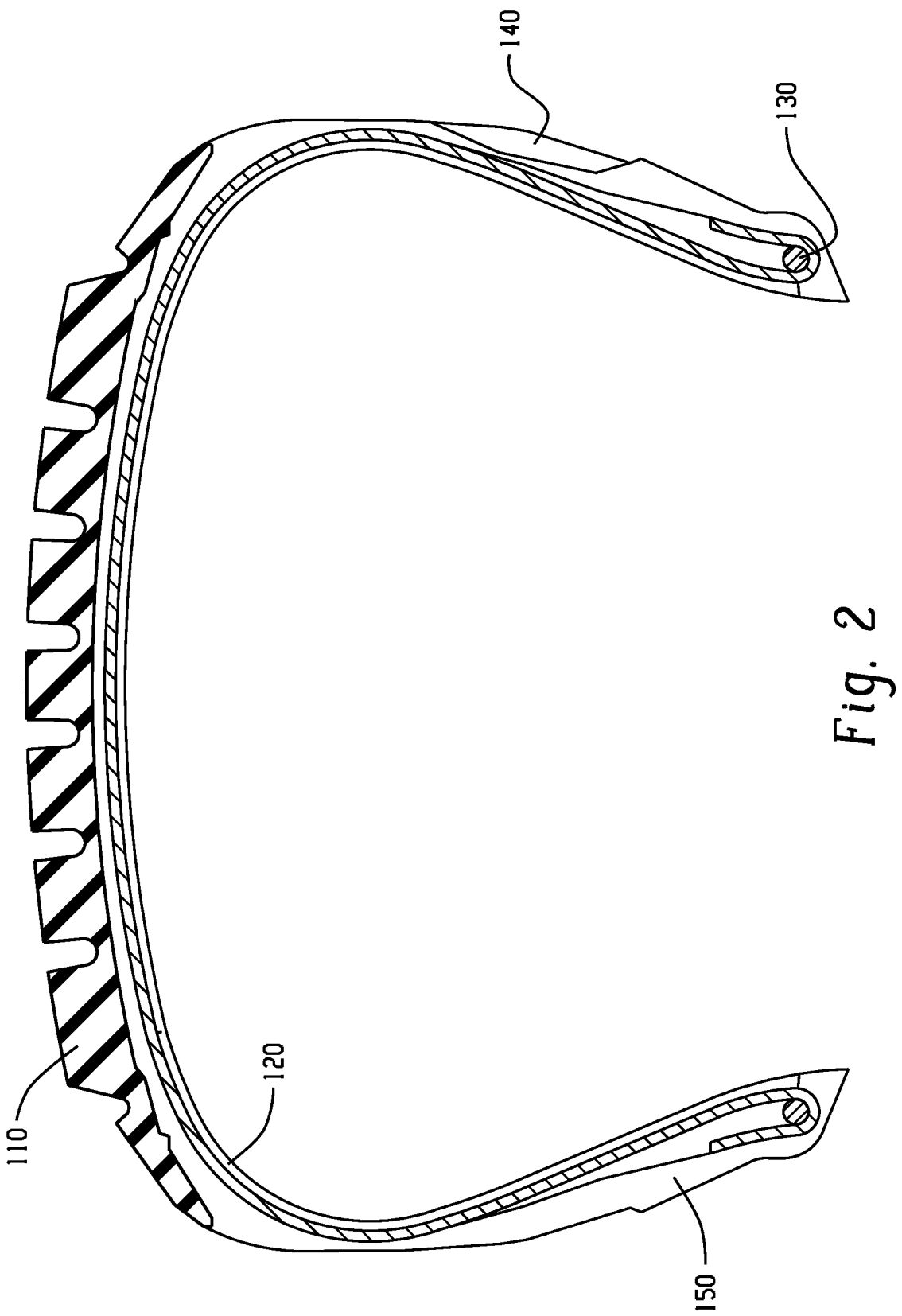
FIG. 2 is a cross-sectional view of a portion of an embodiment of a tire.

FIG. 2 shows a cross-section of a tire 100. In an example application the adhesive is applied to various rubber components of the tire 100 including, but not limited to, new tire construction or existing tire retreading. For instance, the adhesive may be applied to join a spliced tread 110, a spliced inner liner 120, or a spliced bead 130, or to join a sidewall 140 or a carcass layer 150 to the tread 110.

Figure 3:
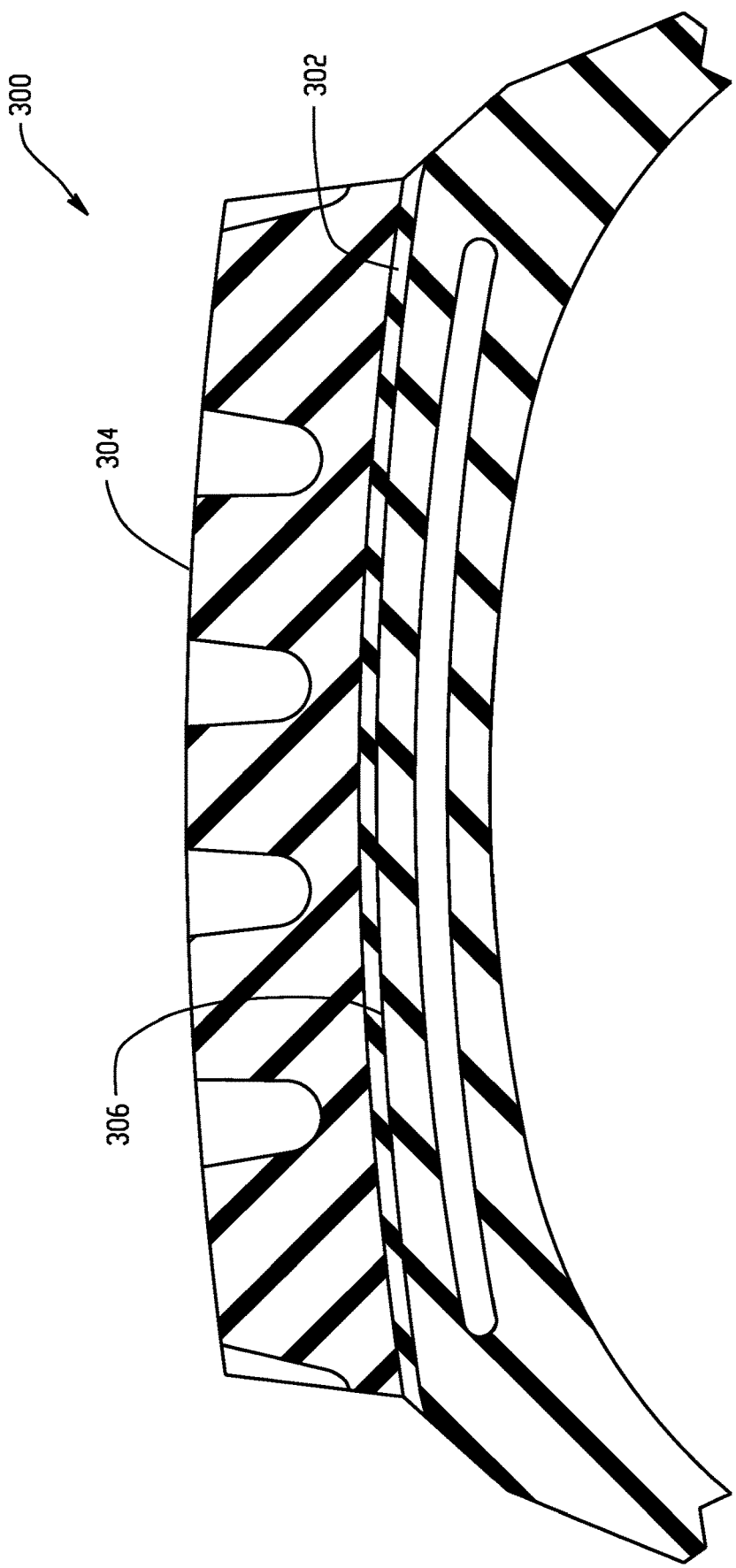
FIG. 3 is a cross-sectional view of a portion of an embodiment of a retreaded tire.

In tire retreading, the cured tread and the cured tire carcass are joined together by combining a cushion layer. The retreaded tire is then heated in a standard set of conditions to allow for curing to occur. In forming a retreaded tire 300, the adhesive may be applied to join a cushion layer 302 to a retreaded carcass 306 or a cushion layer to a new tread 304, as shown in FIG. 3. An example of a retread tire and a method for retreading is disclosed in U.S. Pat. No. 5,603,366, which is incorporated herein by reference.

Typical tire rubber compositions include one or more diene polymers, reinforcing filler, such as carbon black, in an amount such as 40-100 phr, sulfur (cure agent), accelerators, plasticizing oil, antioxidants, and other additives.

New tires are constructed by assembling the individual components in an uncured (green) state, and then, once assembled, the green tire is cured as a whole. An example tire manufacturing method is disclosed in U.S. Pat. No. 4,824,501, which is incorporated herein by reference.

As the Examples below show, the adhesive described herein is well-suited for use in the manufacture of rubber articles such as tires and air springs.

EXAMPLES

Examples 1 and 2

The example adhesives were prepared by sequentially mixing the components listed in Table 1 and allowing them to slowly rotate in a closed vessel for at least 24 hours to ensure mixing and good dispersion. The final example adhesives had solids contents in the range of 35-65% and a pH in the range of 9-12.

TABLE 1

| Component | Amount |
|---|---|
| EXAMPLE 1 | |
| Neoprene Latex | 100 phr |
| Limonene | 5 phr |
| TACOLYN 5003 | 25 phr |
| AQUABLAK 5101 | 25 phr |
| EXAMPLE 2 | |
| Neoprene Latex | 100 phr |
| Limonene | 5 phr |
| AQUATAC 6025 | 25 phr |
| AQUABLAK 5101 | 25 phr |

Examples 3-18

Examples 3-10 were performed to test the tackiness and the strength/durability of the Example 1 and 2 adhesives in comparison to other adhesives and against a stock to stock control when applied to a neoprene rubber composition. Neoprene rubber is commonly used in air springs.

Examples 3-6 were prepared to measure the uncured (green) peel strength. This measurement primarily shows the tackiness of the joint. This indicates an initial adhesiveness to hold a joint together temporarily until it can be cured.

Examples 7-10 were prepared to measure the cured peel strength, which shows the strength and durability of the final cured joint.

The application of the adhesive onto the green rubber stock was done with a foam/sponge brush, in order to get a thin uniform layer of application. The adhesive was allowed to dry at room temperature for one hour before the uncured samples were tested, and before the cured samples were cured by heating at 171° C. for 11.5 min.

In Examples 3 and 7 no adhesive was applied. In Example 3, two uncured neoprene stocks were applied together in an uncured state. In Example 7 the neoprene stocks were applied together uncured and then later cured. This provides a very strong bond, because the same material is being contacted and cured together. The joint is only slightly weaker than an unjointed piece of rubber, partly because some contaminants may bloom to the surface of the joint and contaminate the curing at the joint. Accordingly, these Examples are considered control examples, not comparative Examples.

Examples 4 and 8 were neoprene rubber strips joined with a hexane solvent-based adhesive made from natural rubber and styrene-butadiene rubber.

Examples 5, 6, 9, and 10 employed the adhesives made in Examples 1 and 2.

Examples 11-18 are analogs to Examples 3-10, only differing in that a different Neoprene rubber was used. The Neoprene rubbers 1 and 2 were copolymers of chloroprene and 2,3-dichloro-1,3-butadiene. Neoprene rubber 1 had a Mooney viscosity of about 100-120, and neoprene rubber 2 had a Mooney viscosity of about 41-51.

The peel strength test strength Examples are summarized in Tables 2 and 3.

TABLE 2

| Compounded Air Spring Rubber Stock | Adhesive | 180° Peel Results: Avg. Peel Strength (MPa) |
|---|---|---|
| Example 3 (Control) | Neoprene rubber 1 no cure (green) | Stock-to-Stock (none) | 0.0416 |
| Example 4 (Comparative) | Neoprene rubber 1 no cure (green) | Solvent Adhesive | 0.0333 |
| Example 5 | Neoprene rubber 1 no cure (green) | Example 1 | 0.0380 |
| Example 6 | Neoprene rubber 1 no cure (green) | Example 2 | 0.0447 |
| Example 7 (Control) | Neoprene rubber 1 Cured | Stock-to-Stock (none) | 0.2244 |
| Example 8 (Comparative) | Neoprene rubber 1 Cured | Solvent Adhesive | 0.0435 |
| Example 9 | Neoprene rubber 1 Cured | Example 1 | 0.3125 |
| Example 10 | Neoprene rubber 1 Cured | Example 2 | 0.2976 |

TABLE 3

| Compounded Air Spring Rubber Stock | Adhesive | 180° Peel Results: Avg. Peel Strength (MPa) |
|---|---|---|
| Example 11 (Control) | Neoprene rubber 2 no cure (green) | Stock-to-Stock (none) | 0.0530 |
| Example 12 (Comparative) | Neoprene rubber 2 no cure (green) | Solvent Adhesive | 0.0400 |
| Example 13 | Neoprene rubber 2 no cure (green) | Example 1 | 0.710 |
| Example 14 | Neoprene rubber 2 no cure (green) | Example 2 | 0.0550 |
| Example 15 (Control) | Neoprene rubber 2 cured | Stock-to-Stock | 0.3231 |
| Example 16 (Comparative) | Neoprene rubber 2 cured | Solvent Adhesive | 0.0184 |
| Example 17 | Neoprene rubber 2 cured | Example 1 | 0.2367 |
| Example 18 | Neoprene rubber 2 cured | Example 2 | 0.3520 |

In the construction of the uncured adhesion pads that were used in the tack testing of Examples 3-6, the backing pad was secured to the green rubber neoprene stock using superglue (cyanoacrylate). For the cured adhesion pads that were used in Examples 7-10 to determine the strength and durability of the adhesive bond, the backing pad was cured onto the rubber stock without superglue.

In Examples 3-10, the green rubber stock and the backing pad were weighed before any adhesive was applied. For the adhesive application, a foam/sponge brush was used to apply the adhesive in a thin, uniform layer onto each face of the adhesion pad. It was observed that all of the adhesives coated and wetted the rubber well. The pads were weighed again after the adhesive had been applied and dried at room temperature for at least an hour in order to get the weight of the adhesive. The weights of adhesive in each Example were approximately the same. In Examples 7-10, after the pads were assembled, the samples were cured at 171° C. for 11.5-min.

A standard procedure for 180° peel testing on an Instron 4501 was used for all of the Examples 3-10. These Examples were peel tested at a rate of 2 in/min and the gap distance was 127 mm. The cured Examples 15-18 were aged for 5 days before testing. This same test was performed for both uncured (Examples 3-6, 11-14) and cured adhesion (Examples 7-10, 15-18).

Shown in Table 2 are the uncured and cured results for the 180° peel test for Examples 3-10, respectively. Shown in Table 3 are the uncured and cured results for the 180° peel test for Examples 11-18, respectively. In each Figure the higher the average peel strength indicates the better the adhesive performance.

Table 2 and 3 show the uncured tack comparison and the cured adhesive strength comparison. The Example 1 and 2 adhesive formulations demonstrate versatility on different types of air spring rubber, and in either the uncured or cured state. In addition, the water-based adhesives of Examples 1 and 2 reduce the VOC emissions released upon drying in comparison to a traditional solvent-based adhesive.

Example 19

The Example 19 adhesive was prepared by sequentially mixing the components listed in Table 4 and allowing them to slowly rotate in a closed vessel for at least 24 hours to ensure mixing and good dispersion. The final adhesive had a solids content in the range of 35-65% and a pH in the range of 9-12.

TABLE 4

EXAMPLE 19

| Component | Amount |
|---|---|
| Natural Rubber Latex | 100 phr |
| IGEPAL CO-887 | 1 phr |
| Limonene | 10 phr |
| TACOLYN 5070 | 25 phr |
| AQUABLAK 5101 | 25 phr |

Examples 20-25

Examples 20-25 were performed to test the tackiness and the strength/durability of the Example 19 adhesive in comparison to other adhesives and against a stock to stock control when applied to a typical styrene-butadiene and natural rubber blend tire compound that also included carbon and silica, sulfur, and accelerators.

Examples 20-22 were prepared to measure the uncured (green) peel strength, which primarily shows the tackiness of the joint. This indicates an initial adhesiveness to hold a joint together temporarily until it can cure.

Examples 23-25 were prepared to measure the cured peel strength, which shows the strength and durability of the final cured joint.

The application of the adhesive onto the green SBR/NR stock was done with a foam/sponge brush, in order to get a thin uniform layer of application. The adhesive was allowed to dry at room temperature for one hour before the uncured samples were tested, and before the cured samples were cured by heating at 171° C. for 15 min. The amount of adhesive was approximately equal in all Examples.

In Examples 20 and 23 no adhesive was applied. In Example 20, two uncured SBR/NR stocks were applied together in an uncured state, in Example 23 the stocks were applied together uncured and then cured.

Examples 21 and 24 were SBR/NR strips joined with a hexane solvent-based adhesive made from natural rubber and styrene-butadiene rubber.

Examples 22 and 25 employed the adhesive made in Example 19.

TABLE 5

| | Compounded Air Spring Rubber Stock | Adhesive | 180° Peel Results: Avg. Peel Strength (MPa) |
|---|---|---|---|
| Example 20 (Control) | Natural Rubber no cure (green) | Stock-to-Stock (None) | 0.0012 |
| Example 21 (Comparative) | Natural Rubber no cure (green) | Solvent Adhesive | 0.0664 |
| Example 22 | Natural Rubber no cure (green) | Example 19 | 0.0702 |
| Example 23 (Control) | Natural Rubber cured | Stock-to-Stock (none) | 0.3861 |
| Example 24 (Comparative) | Natural Rubber cured | Solvent Adhesive | 0.2133 |
| Example 25 | Natural Rubber Cured | Example 19 | 0.2326 |

The same test method was performed on Examples 20-25 that was performed on Examples 3-18.

Shown in Table 5 are the uncured and then cured results for the 180° peel test for Examples 20-25, respectively. In Table 5 the higher the average peel strength indicates the better adhesive performance.

Table 5 also shows the uncured tack comparison of Examples 20-22 and the cured adhesive strength comparison of Examples 23-25. The Example 19 adhesive formulation tested in Examples 22 and 25 demonstrates excellent performance on SBR/NR in either the cured or uncured state. In addition, the water-based adhesive of Example 19 reduces the VOC emissions released upon drying in comparison to the traditional solvent-based adhesive.

Prospective Examples 26-28

Prospective example adhesives incorporating guayule resin may be prepared by sequentially mixing the components listed in Table 6 and allowing them to slowly rotate in a closed vessel to ensure mixing and good dispersion.

In Prospective Examples 26 and 27 a guayule resin may be incorporated as the penetrant.

In Prospective Example 27, a purified form of guayule rubber latex may be used as the latex component of the adhesive.

In Prospective Example 28 guayule latex may be used that includes both the guayule rubber and guayule resin.

The final products in each of Prospective Examples 26-28 would be expected to have a solids content in the range of 35-65% and a pH in the range of 9-12.

TABLE 6

| Component | Amount |
|---|---|
| EXAMPLE 26 (Prospective) | |
| Natural Rubber Latex | 100 phr |
| Guayule Resin | 5 phr |
| TACOLYN 5003 | 25 phr |
| AQUABLAK 5101 | 25 phr |
| EXAMPLE 27 (Prospective) | |
| Guayule Rubber Latex (purified) | 100 phr |
| Guayule Resin | 5 phr |
| AQUATAC 6025 | 25 phr |
| AQUABLAK 5101 | 25 phr |
| EXAMPLE 28 (Prospective) | |
| Guayule Latex (including guayule rubber and guayule resin) | 105 phr |
| AQUATAC 6025 | 25 phr |
| AQUABLAK 5101 | 25 phr |

It is expected that the prospective water-based adhesive formulations above will have reduced VOC emissions and improved tack and cured adhesion. In particular, these advantages may be useful in tire building applications.

Examples 29-32

The adhesives in Examples 29 and 30 were prepared by sequentially mixing the components listed in Table 7 and allowing them to slowly rotate in a closed vessel to ensure mixing and good dispersion. The final adhesives had a solids content in the range of 50-60% and a pH in the range of 9.5-11.5. The guayule latex used in Example 30 was in a purified form that included only guayule rubber with little or no guayule resin present.

TABLE 7

| EXAMPLES | 29 | 30 |
|---|---|---|
| HARTEX 101 (FIRESTONE RUBBER) | 100 phr | |
| Guayule Rubber Latex (purified) (YULEX CORP.) | | 100 phr |
| IGEPAL CO-887 | 1 phr | 1 phr |
| Limonene | 10 phr | 10 phr |
| TACOLYN 5070 | 25 phr | 25 phr |
| AQUABLAK 5101 | 25 phr | 25 phr |

Example 31 is a comparative example of a solvent based adhesive. A comparison of cured and uncured peel strengths is provided below in Table 8. The peel tests were conducted by applying the adhesives onto uncured (green) and cured styrene-butadiene rubber stock at approximately equal thicknesses. The adhesive was allowed to dry at room temperature for one hour before the uncured samples were tested. The cured samples were prepared by heating the green stocks with the adhesive applied on them at 171° C. for 15 min.

TABLE 8

| | | Maximum Uncured Peel Force (kN) ± error | Maximum Cured Peel Force (kN) ± error |
|---|---|---|---|
| Example 29 | HARTEX 101 Adhesive | 0.064 ± 15% | 0.263 ± 10% |
| Example 30 | Guayule Latex Adhesive | 0.058 ± 20% | 0.180 ± 20% |
| Example 31 | Hexane-based adhesive made from NR and SBR | 0.049 ± 18% | 0.181 ± 25% |

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's general inventive concept.

It is claimed:

1. An article of manufacture comprising:
   an elastomeric rubber component comprising an elastomer selected from the group consisting of: polychloroprene, butyl rubber, natural rubber, guayule rubber, polyisoprene, polybutadiene, nitrile rubber, poly(styrene-butadiene), and combinations thereof;
   the elastomeric rubber component being joined at an interface with a second rubber component or another portion of the elastomeric rubber component;
   wherein the interface is formed by a layer of a water-based adhesive, the water-based adhesive comprising:
   a polymeric latex;
   a penetrant selected from the group consisting of: terpenes, polylimonene, limonene, carvone, α-pinene, citral, dipentene, 1,8-cineole, eucalyptol, citronellol, geraniol, citronellene, terpinen-4-ol, borneol, camphor, guayule resin, and combinations thereof; and
   a reinforcing filler in an amount of 10 to about 80 phr;
   wherein the adhesive has a solids content of 35-65% and a pH of about 9 to about 12;
   wherein the article of manufacture is a rubber air spring wherein the elastomeric rubber component or the second rubber component is uncured.

2. The article of manufacture of claim 1 wherein the penetrant is limonene.

3. The article of manufacture of claim 1 wherein the reinforcing filler is a carbon black aqueous dispersion.

4. The article of manufacture of claim 1, wherein a polymer of the polymeric latex is hevea natural rubber, non-hevea natural rubber, or polychloroprene.

5. The article of manufacture of claim 1, wherein the adhesive further comprises a tackifier that is an aliphatic hydrocarbon resin with a pH of about 2 to about 13 and a solids content of about 30% to about 80%.

6. The article of manufacture of claim 1, wherein the polymeric latex comprises water and a polymer selected from the group consisting of polychloroprene, butyl rubber, hevea or non-hevea natural rubber, polyisoprene, polybutadiene, nitrile rubber, poly(styrene-butadiene), and combinations thereof.

7. The article of manufacture of claim 1, wherein the polymeric latex comprises water and a polymer selected from the group consisting of polychloroprene, butyl rubber, hevea or non-hevea natural rubber, polyisoprene, polybutadiene, nitrile rubber, and combinations thereof.

8. The article of manufacture of claim 6, wherein the polymer of the polymeric latex has a number average molecular weight of about 100,000 to about 5,000,000 g/mol; and a Tg of about 110° C. to about 25° C.

9. The article of manufacture of claim 1, wherein the adhesive further comprises about 1 to about 10 phr of a non-ionic surfactant stabilizer with a pH of about 5 to about 13.

10. The article of manufacture of claim 1 wherein the adhesive is substantially or completely free of VOC-containing or eluting solvent.

11. The article of manufacture of claim 1, wherein the elastomeric rubber component comprises polychloroprene.

12. The article of manufacture of claim 2, wherein the adhesive further comprises:
   a non-ionic surfactant stabilizer; and
   an aliphatic hydrocarbon resin tackifier, wherein the aliphatic hydrocarbon resin tackifier, has a softening point of 26° C. to 130° C. and a solids content of 45% to 63%;

wherein the reinforcing filler is a carbon black aqueous dispersion, wherein the carbon black is in an amount of about 15 to about 80 phr and is selected from the group consisting of the following series: N100, N200, N300, N400, N500, N600, N700, N800, and N900;

wherein the adhesive is substantially or completely free of VOC-containing or eluting solvent;

wherein the adhesive is substantially or completely free of cure agents;

wherein the polymer of the polymeric latex is hevea natural rubber, non-hevea natural rubber, or polychloroprene, and has a number average molecular weight of about 100,000 to about 5,000,000 g/mol; and a Tg of about −110° C. to about −25° C.

* * * * *